Art I. Robinson
INVENTOR.

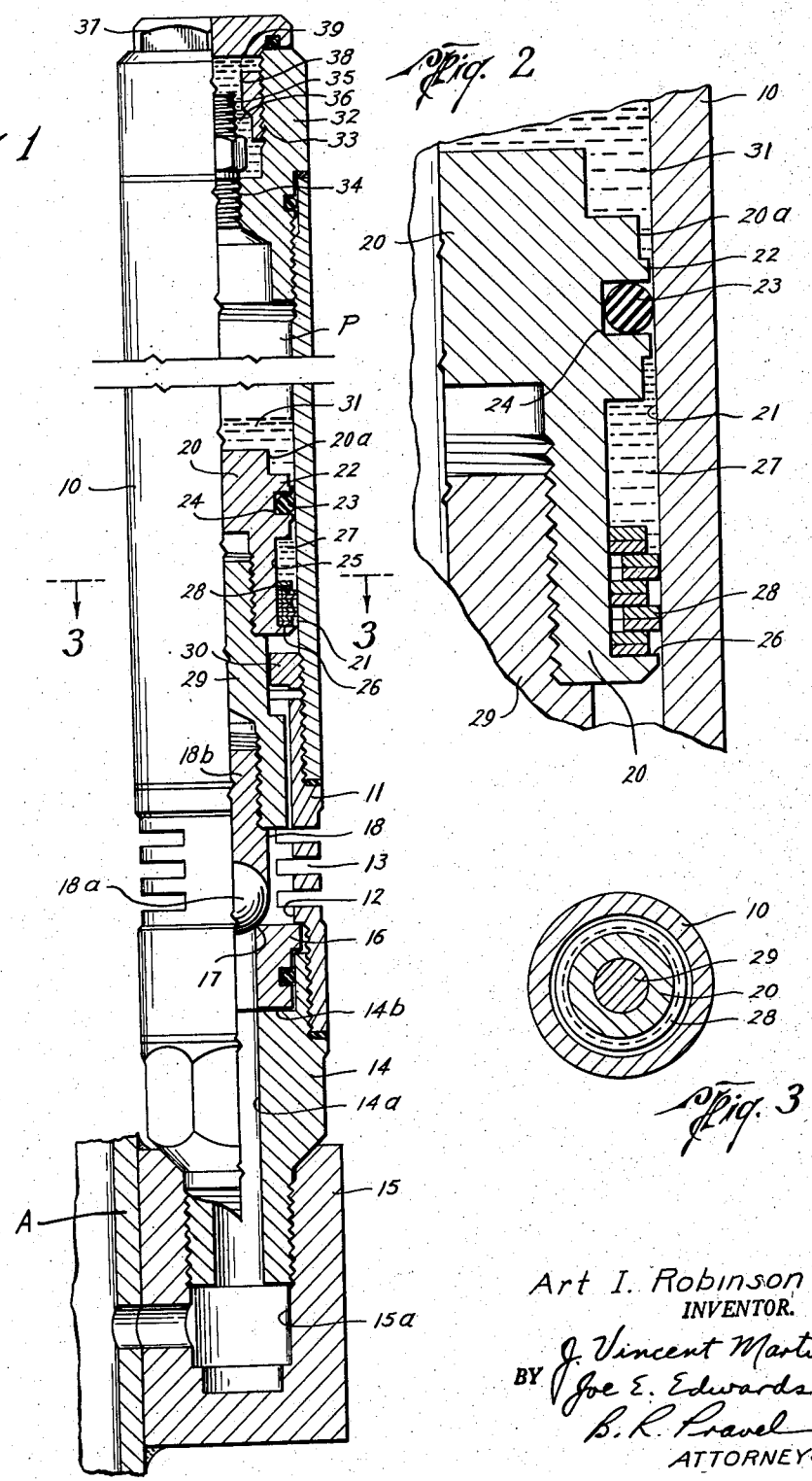

BY J. Vincent Martin
Joe E. Edwards
B. R. Pravel
ATTORNEYS

2,894,793

WELL FLOW VALVE DEVICES

Art I. Robinson, Dallas, Tex., assignor to Merla Tool Corporation, Dallas, Tex., a corporation of Texas Application August 23, 1955, Serial No. 529,984

6 Claims. (Cl. 309—23)

This invention relates to new and useful improvements in well flow valve devices.

This application is filed as a continuation-in-part of my co-pending application Serial No. 341,878, filed March 12, 1953, now abandoned.

Various types of pressure-actuated flow valves have come into general use for controlling the admission of a lifting fluid or gas into a column of liquid in the well conductor and many of such valves employ an operating bellows as the pressure-responsive element which actuates the main valve member. Although a bellows has the advantage of being pressure-tight, it has certain disadvantages which are undesirable; for example, it is relatively fragile and subject to breakage, its travel or movement is definitely limited so that movement of the valve which it controls is accordingly restricted, and in addition its cross-sectional area must necessarily be less than the housing in which it is mounted so that the area of the bellows exposed to operating pressure is limited by this factor.

Piston elements for controlling the operation of flow valves have also been employed and although such piston elements overcome the disadvantages of the bellows as to strength and durability, amount of travel, and pressure area, such elements in the past have been subject to leakage. Because a piston element must depend upon a close fit with its cylinder wall for efficient sealing, any contamination of the wall or of the usual sealing or piston ring of said element results in leakage past the element which renders said element inefficient in its operation.

It is therefore one object of this invention to provide a flow valve device having an improved piston element assembly for controlling the operation of a main valve member, said assembly being constructed to operate efficiently over long periods of time without danger of leakage.

An important object is to provide a piston element assembly for a flow valve device, wherein a sealing ring on the piston element is protected against direct contact with the well fluids and is also protected against contact by the pressure fluid which actuates the piston, whereby such fluids cannot adversely affect the seal between the piston element and cylinder wall.

Still another object is to provide a piston element having a sealing ring of the "O-ring" type thereon, together with a grease retainer section below the O-ring, whereby the grease within said section not only protects the ring against contact with and possible contamination from the well fluids being handled by the valve, but also lubricates said O-ring as well as the cylinder wall to increase the efficiency of operation.

A further object is to provide an improved flow valve device including a pressure chamber containing a fluid under a predetermined pressure with the piston element having one side acted upon by said predetermined pressure; the device including a barrier liquid which is disposed between the piston and the fluid in the chamber, whereby the sealing element of the piston is protected against direct contact with such fluid.

Still another object is to provide an improved closure means for efficiently sealing the end of the pressure chamber of a flow valve device.

Other and further objects of the invention will appear from the description of the invention.

In the accompanying drawings, which form a part of the instant specification, which are to be read in conjunction therewith and wherein like reference numerals are used to indicate like parts in the various views:

Figure 1 is a view partly in section and partly in elevation of an improved flow valve device constructed in accordance with the invention;

Figure 2 is an enlarged sectional detail of the piston;

Figure 3 is a horizontal cross-sectional view taken on the line 3—3 of Figure 1.

Figure 4:
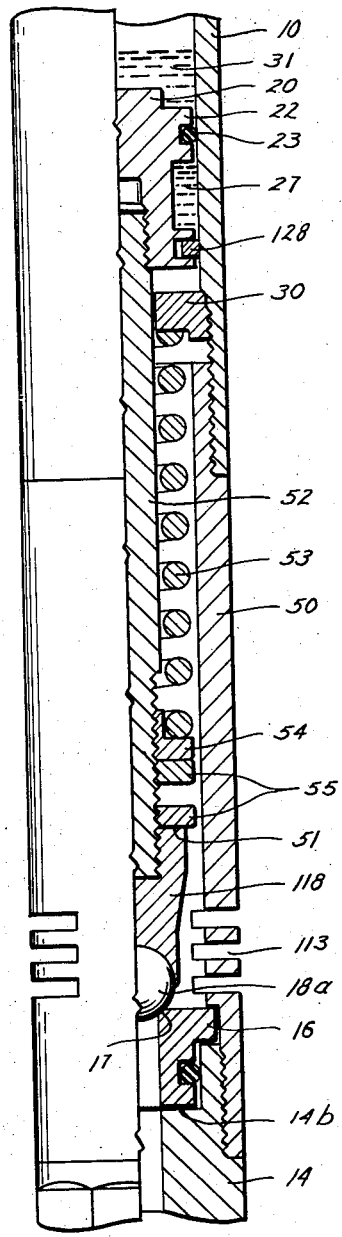
Figure 4 is a view, partly in section and partly in elevation of a modified form of the device.

In the drawings, the numeral 10 designates a tubular housing or casing which has an annular valve housing 11 connected to its lower end. The valve housing is provided with an axial bore 12 having radial slots or inlets 13 whereby communication between the bore and the area exteriorly of the housing is established. A tubular adapter 14 is threaded into the lower end of the valve housing 11 and is arranged to connect with an inlet lug 15 which is suitably secured to the well conductor or tubing A; the adapter has a bore 14a communicating with a passage 15a in the lug. It will be evident that communication between the area exteriorly of the valve housing 11 is established through the inlet slots 13 and bore 12 of said housing, bore 14a of the adapter and bore 15a of the inlet lug, these parts forming a passage through the valve housing and adapter.

A valve seat ring 16 is mounted within the upper portion of the adapter 14 being supported upon a suitable shoulder 14b, and said ring is formed with an annular valve seat 17. It is preferable that the bore through the valve seat ring be of substantially the same diameter as the bore 14a of the adapter. A valve member 18 is adapted to engage the annular valve seat 17 and when in a seated position closes flow through the passage which communicates with the interior of the well conductor; when the valve member is unseated, the fluids from exteriorly of the housing may flow past the open valve member and into the conductor A. Although the valve member may be of any desired construction, said member is shown as comprising a ball 18a secured to the lower end of a cylindrical stem 18b.

The movement of the valve member 18 is controlled by the pressure differential across a piston element 20, which element is mounted within the lower end of the bore of the housing or casing 10, this section of the bore forming a cylinder 21 for the piston. It is preferable that the cylinder portion 21 of the piston be provided with a hard smooth-working surface which may be obtained by chrome plating said surface and thereafter honing or lapping the same to the desired size. The piston element includes a cylindrical head portion 22 which has its external surface substantially fitting the cylindrical wall 21 with a close tolerance. An O-ring type sealing ring 23 is disposed within a groove 24 formed in the piston head, and said ring engages the cylinder wall 21 with a sealing engagement.

Below the O-ring seal the external diameter of the piston element is reduced, as indicated at 25, and at the lower end of such reduced portion an external shoulder 26 is formed. A heavy grease indicated at 27 fills the area between the reduced portion 25 of the piston element and the cylinder wall, and said grease is retained in this annular space by a plurality of retaining rings 28 which surround the piston element and are supported on the shoulder 26. It is preferable that the retaining rings be in the form of washers and that said washers be constructed of "Teflon" or similar material which has a low coefficient of friction and which is chemically inert to the well fluids. The rings 28 may be arranged in pairs with alternate pairs engaging the piston element and the cylinder wall, as is clearly shown in Figure 2. Although a plurality of retainer rings are illustrated, it is pointed out that if desired only a single ring could be employed.

As is well known, "Teflon" is a trademark applied to the polymers of tetrafluoroethylene. This material is substantially chemically inert and withstands attack by well fluids; it has an extremely low coefficient of friction with metal so that when in contact or engagement with metal it does not appreciably resist movement relative thereto. By constructing the retaining rings of this material said rings function to efficiently retain the grease for an appreciable length of time without interferring with or setting up undue resistance to the normal movement of the piston in its operation.

The piston element 20 is connected through a coupling 29 with the upper end of the valve stem 18b, and as the piston reciprocates within its cylinder 21 the valve element will be moved with respect to its seat 17. Downward movement of the piston element 20 is limited by a stop ring 30 which is threaded within the lower portion of the housing 10 just above the valve housing 11. It will be evident that when the valve member is closed or seated, pressure fluid from exteriorly of the housing may enter through slots 13 and may pass upwardly through the bore 12 of the valve housing, and then into the lower end of cylinder 21 to act against the lower end of the piston element 20 to urge the piston upwardly.

It is noted that although the retaining washers 28 are in engagement with the wall of the cylinder said washers do not have a fluid-tight sealing engagement with said wall, it having been found that sliding engagement of the washers with the wall is sufficient to retain the relatively heavy grease 27 within the annular cavity formed by the reduced portion 25 of the piston. Thus the fluid pressure from the area exteriorly of the tubing which acts against the lower end of the piston may in fact by-pass the retainer washers 21 whereby pressures above and below the washers are equalized; however, this pressure cannot by-pass the O-ring sealing element 23 and its force is therefore directed against the lower end of the piston. Since the grease chamber above the retainer washers is subjected to the same pressure as the area below the retainer washers, the grease 27 and washers merely move with the piston, the movement of which is controlled by the differential in pressure within the chamber P on the one hand and the pressure in the area exteriorly of the tubing on the other hand.

The pressure fluid which acts against the underside of the piston is that fluid which is present in the area exteriorly of the tubing and the grease section prevents said fluid from directly contacting the O-type sealing ring 23, whereby said ring is protected against contamination by said fluid and by any foreign matter contained in said fluid. Also, as the piston reciprocates within its cylinder, the grease 27 functions to lubricate the cylinder wall and the underside of the sealing ring 23 to assure efficient sealing by said ring.

The pressure which is acting against the underside of the piston is tending to open the valve 18, and this pressure is resisted by a predetermined pressure which is disposed within a pressure chamber P formed within the upper end of the housing 10. A suitable gas, such as nitrogen gas, is introduced into the pressure chamber P under a desired or predetermined pressure, and in order to protect the sealing ring 23 from direct contact with such gas a barrier fluid or liquid indicated at 31 is disposed on top of the piston element 20. The extreme upper end of the piston element may be reduced as indicated at 20a so that the entire upper end of the piston element will be completely enclosed or covered by the layer of liquid. The liquid 31 forms a barrier between the gas and the upper end of the piston and prevents direct contact of said gas within the chamber P with the sealing ring 23. It is evident that the piston will be moved by the differential between the pressure in chamber P and the pressure which is present in the area exteriorly of the housing. Whenever the exterior pressure exceeds that within the chamber P, the valve will be opened and the pressure fluid from exteriorly of the housing will be directed past the valve seat 17 into the well conductor A.

The upper end of the pressure chamber is adapted to be closed by a plug 32 which is threaded into the upper end of the housing 10. The plug 32 has a central bore 33 provided with a reduced threaded portion 34 and a filling valve 35 is adapted to connect therein. After pressure has been introduced through the filling valve 35, the upper portion of the bore 33 is completely filled with fluid 36 and a closure 37 is then threaded into said bore. The closure has an axial bore 38 which does not extend completely through the closure but which has its upper end communicating with a lateral port 39. As the closure is threaded into position within the bore 33, the excess fluid therein is forced outwardly through passage 39 and when the closure is in final position the filling valve 35 is completely surrounded by a fluid which is within the lower end of bore 33, axial bore 38 and lateral port 39. Since the fluid is not compressible, it is evident that should the valve 35 develop a leak, the fluid would provide a seal against such leakage.

The operation of the device is believed obvious from the foregoing. With the parts in the position shown in Figure 1, and the main valve member 18 seated, the predetermined pressure within the chamber P is holding said valve in its closed position. The pressure exteriorly of the housing 10 is acting through slots 13 and bore 12 against the under side of the piston element 20 and when this pressure exceeds that of the predetermined pressure in chamber P, the piston is moved upwardly which unseats the valve 18 and allows an introduction of fluid from the area exteriorly of the housing into the well conductor A. The travel of the valve in an upward direction is substantially unlimited since any desired upward movement of the piston within the cylinder may be had. This means that the valve element can be moved out of the line of flow to provide a full opening valve; also, the valve element may be moved out of the line of flow so that damage to the valve by the abrasive action of flowing fluid is obviated. When the pressure exteriorly of the housing is reduced to the predetermined point as controlled by the pressure in chamber P, the pressure in chamber P will return the valve to its closed position.

It will be obvious that the sealing ring 23 which maintains the seal between the piston 20 and the cylinder wall is protected against any direct contact by the fluids which may be present in the valve member housing and which may flow upwardly into the lower end of the cylinder 21. This protection is afforded by the Teflon retainer washers and the grease pack 27, and therefore the sealing ring cannot be damaged by contact with said fluids. The sealing ring is also protected against contact with the gas in the chamber P by the barrier liquid 31 which overlies the piston 20. The grease pack 27 moving with the piston maintains the required lubrication of the sealing ring and also functions to lubricate the wall of the cylinder to thereby protect the smooth surface thereof.

By providing protection for the sealing ring of the piston it is possible to employ the piston element without any danger of the same developing leakage over extended periods of operation. The advantage of employing the piston, as distinguished from a relatively fragile bellows, is that said piston is substantially indestructible and may undergo a considerably greater travel to provide for increased travel of the valve. In addition, by employing a piston the cross-sectional area exposed to the pressures which are acting upon the piston, may be brought out to the full size of the bore of the housing 10 to provide a larger area than could be provided with the bellows. This assures more sensitive control and better overall operation of the valve. As has been pointed out, one of the important features of the invention is the provision of the grease section below the sealing ring and the provision of the barrier liquid above said sealing ring whereby said ring is completely protected against contact with the pressure fluids which might damage the same.

In Figure 4, a slightly modified form of the invention is shown wherein a spring means is provided; such spring means urges the valve member toward closed position and is added to the pressure in chamber P to control the opening pressure of the valve. Obviously, by controlling the strength and adjustment of the spring more accurate control of opening pressure may be accomplished.

As shown in Figure 4, a spring housing section 50 is substituted for the valve housing 11 being connected between the adapter 14 and the main housing 10. The section 50 has the inlet openings or slots 113, similar to inlets 13, therein. A valve member 118 having an external shoulder 51 thereon is substituted for valve 18 and an elongate stem 52 is substituted for coupling 29, said stem connecting the valve member 118 with the head portion 22. In this form the head portion 22 is provided with only a single retaining ring 128 for retaining the grease 27 instead of a plurality of rings 28 as in Figure 1.

A coiled spring 53 surrounds the stem 52 and has its upper end engaging the stop ring with its lower end resting upon an adjusting nut 54 which is threaded on the lower portion of the stem 52. The nut 54 is adjustable to vary the tension of the spring 53 and suitable lock nuts 55 may be manipulated in the usual manner to maintain the adjustment. It is evident that the spring 53 constantly exerts its pressure to urge the valve member 118 toward a seated position, and thus the spring is added to the pressure in chamber P to control opening pressure of the valve.

The operation of the modification shown in Figure 4 is the same as heretofore described with respect to the device illustrated in Figure 1, with the exception that the spring 53 is included to enter into the operation of the valve member. Manifestly, the spring provides for more accurate adjustment to give closer control and is also useful in making adjustments in the field. It is also noted that if a throttling action of the valve is desired, a strong spring with relatively low pressure in chamber P could be employed to obtain desired results. Of course, the modification has all the advantages of the piston which is sealed in the same manner as the first form of the invention.

The foregoing disclosure and description of the invention is illustrative and explanatory thereof and various changes in the size, shape and materials, as well as in the details of the illustrated construction, may be made, within the scope of the appended claims, without departing from the spirit of the invention.

What I claim is:

1. In a flow valve device having a well fluid control valve, an operating piston assembly for actuating said valve comprising, a cylinder, a piston comprising a substantially cylindrical body slidable within the cylinder, a head portion on the body formed with a groove, a sealing ring within the groove and having sealing contact with the wall of the cylinder, the external surface of the body below the sealing ring having an annular recessed portion, a lubricant within the annular space between the recessed portion and the cylinder wall, and a plurality of annular retaining rings mounted within the lower end of said recessed portion and contacting the cylinder wall to retain the lubricant therein.

2. In a flow valve device having a well fluid control valve, an operating piston assembly for actuating said valve comprising, a cylinder, a piston comprising a substantially cylindrical body slidable within the cylinder and defining therewith a pressure dome, a fluid charge in said dome, a head portion on the body formed with a groove, a sealing ring within the groove and having sealing contact with the wall of the cylinder, the external surface of the body below the sealing ring having an annular recessed portion, a grease within the annular space between the recessed portion and the cylinder wall, and a body of liquid confined within the cylinder and in contact with the upper end of the piston for protecting the sealing ring from direct contact with the fluid which is present in the cylinder above said piston.

3. In a flow valve device having a well fluid control valve, an operating piston assembly for actuating said valve comprising, a cylinder, a piston slidable within said cylinder, a resilient sealing ring on one end of the piston in sealing engagement with the cylinder wall, said piston having its diameter reduced inwardly of the sealing ring to form an annular recess, a protective grease within said recess, and a retaining ring mounted on the piston in spaced relationship to the sealing ring and engaging the cylinder wall to retain said grease within the recess, said retaining ring being constructed of a sealing material having a low coefficient of friction and having the property of being chemically inert to an operating fluid which acts against that end of the piston on which the retaining ring is mounted, whereby the resilient ring is protected against contact with said operating fluid.

4. An operating piston assembly as set forth in claim 3, together with a pressure fluid confined in the cylinder between that end of the piston on which the resilient sealing ring is mounted and the adjacent end of the cylinder, and a barrier liquid confined between said pressure fluid and the end of the piston for protecting the sealing ring against contact with said pressure fluid.

5. In a flow valve device having a well fluid control valve, an operating piston assembly for actuating said valve comprising a cylinder, a piston slidable within said cylinder , a resilient sealing ring on one end of the piston in sealing engagement with the cylinder wall, said piston having its diameter reduced inwardly of the sealing ring to form an annular recess, a protective grease within said recess, and a retaining ring mounted on the piston and having sliding contact with the cylinder wall to retain said grease within the recess, said retaining ring being constructed of "Teflon" material, whereby the resilient ring is protected against contact by the operating fluid which acts against that end of the piston on which the retaining ring is disposed.

6. In a flow valve device having a well fluid control valve, an operating piston assembly for actuating said valve comprising, a cylinder, a piston slidable within said cylinder, a resilient sealing ring on one end of the piston in sealing engagement with the cylinder wall, said piston having its diameter reduced inwardly of the sealing ring to form an annular recess, and a plurality of retainer rings encircling the reduced portion of the piston at that end of the annular recess remote from the resilient sealing ring and having their outer peripheries in sliding contact with the cylinder wall to span one end of the annular recess, the opposite end of the annular recess being sealed by the resilient sealing ring, a lubricant within said annular recess, each retaining ring being constructed of a sealing material having a low coefficient of friction and having the property of being chemically inert to an operating fluid acting against that end of the piston on which the retaining rings are mounted, whereby said resilient ring is protected against contact with said operating fluid.

References Cited in the file of this patent

UNITED STATES PATENTS

| | | |
|---|---|---|
| 1,409,556 | Le Brun | Mar. 14, 1922 |
| 1,950,013 | Sefton | Mar. 6, 1934 |
| 1,984,144 | Laugaudin | Dec. 11, 1934 |
| 2,107,494 | Onions et al. | Feb. 8, 1938 |
| 2,278,420 | Boynton | Apr. 7, 1942 |
| 2,685,886 | Peters | Aug. 10, 1954 |
| 2,705,177 | Waring | Mar. 29, 1955 |